(12) United States Patent
Watanabe et al.

(10) Patent No.: US 7,169,506 B2
(45) Date of Patent: Jan. 30, 2007

(54) ELECTROCHEMICAL CELL

(75) Inventors: Shunji Watanabe, Sendai (JP);
Yoshimi Kanno, Sendai (JP); Tsugio Sakai, Sendai (JP)

(73) Assignee: SII Micro Parts Ltd. (JP)

( * ) Notice: Subject to any disclaimer, the term of this patent is extended or adjusted under 35 U.S.C. 154(b) by 260 days.

(21) Appl. No.: 10/822,993

(22) Filed: Apr. 13, 2004

(65) Prior Publication Data

US 2004/0224224 A1 Nov. 11, 2004

(30) Foreign Application Priority Data

Apr. 24, 2003 (JP) ............................... 2003-119453

(51) Int. Cl.
*H01M 6/08* (2006.01)
*H01M 2/02* (2006.01)

(52) U.S. Cl. ...................................... 429/164; 429/178
(58) Field of Classification Search ................ 429/178, 429/164, 121
See application file for complete search history.

(56) References Cited

FOREIGN PATENT DOCUMENTS

JP 2003-168857 * 6/2003

* cited by examiner

*Primary Examiner*—Patrick Joseph Ryan
*Assistant Examiner*—Thomas H. Parsons
(74) *Attorney, Agent, or Firm*—Adams & Wilks

(57) ABSTRACT

An electrochemical cell capable of reflow soldering has a terminal for connection to a circuit board. The terminal is fixed to either the positive pole can or the negative pole can, and the bottom surface of the other pole can which is not fixed to the terminal is provided with a layer consisting of at least one of Au, Sn, Sn-alloy and Ni.

10 Claims, 3 Drawing Sheets

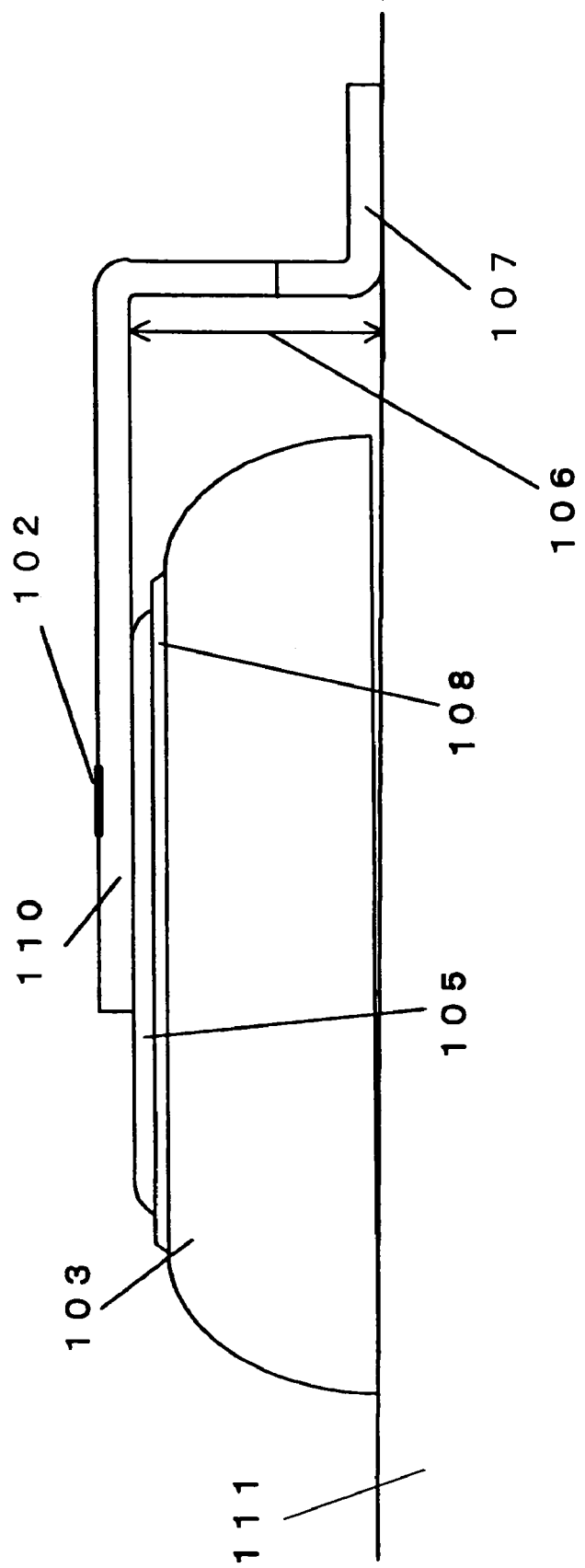

ELECTROCHEMICAL CELL

BACKGROUND OF THE INVENTION

1. Field of the Invention

The present invention relates to an electrochemical cell such as a battery of button or coin type, or a capacitor.

2. Description of the Background Art

An electrochemical cell, such as a primary battery, a secondary battery or a capacitor of coin or button type, employed as a backup auxiliary power source for clock and memory functions of portable equipment, is usually utilized with two terminals mounted as positive and negative poles of the battery.

With the recent progress in size reduction of components, there now are mounting boards with holes for terminals which are inserted in the top surface and soldered from the rear surface of the board (for example, cf. patent reference 1). Also, in a type widely employed recently, an electrochemical cell to which terminals are attached beforehand are simply placed on a board, and solder-plated end portions of the terminals are fixed by soldering to the top side of the board (for example cf. patent reference 2). FIG. 2 shows a lateral view of a conventional electrochemical cell having two terminals. As illustrated therein, the electrochemical cell is formed by hermetically sealing a positive pole can 103 and a negative pole can 105 with a gasket 108, and the positive-pole can 103 and a positive pole terminal 104 are fixed at a laser weld point 101. The negative pole can 105 and a negative pole terminal 110 are fixed at a laser welded point 102. The positive pole terminal 104 and the negative pole terminal 110 are provided respectively with a plated layer 109 and a plated layer 107. Since the soldering to a circuit board 111 is executed at these two terminals, there is required a mounting area corresponding to such two terminals. In case the electrochemical cell is employed as a memory backup power source, there is often employed a method of welding terminals suited for soldering to the electrochemical cell and then soldering the cell to the circuit board together with a memory device. The soldering to the circuit board has been executed with a soldering iron, but, as a result of reduction in dimensions and expansion of functions of the product, it has become necessary to mount a larger number of electronic components within a limited area circuit board and it has become difficult to secure space for inserting the soldering iron. Also, there is demand for an automated process for soldering, for cost reduction.

Therefore, a reflow soldering process is currently employed, by applying a solder cream or the like in the location on the circuit board to be soldered and placing the component to be attached on that, or else providing a small solder ball to a part of the circuit board to be soldered after a component is placed on the circuit board, and then passing the circuit board, bearing the component thereon, through an oven of such a high temperature that the part to be soldered assumes a temperature equal to or higher than the melting point of solder, for example 200 to 260° C., thereby melting the solder and achieving the soldering operation.

[Patent Reference 1] JP-A No. 61-18568 (FIGS. 1 and 2)
[Patent Reference 2] JP-A No. 11-40174 (FIG. 1)

As a result of a size reduction of the equipment in which an electrochemical cell is mounted, a further reduction in the mounting area is also demanded for the electrochemical cell. However, even if the electrochemical cell itself can be made smaller, it has been difficult to reduce the dimension of the terminals and still secure a stability and a peeling strength of soldering. Also the conventional electrochemical cell is provided with two terminals, namely a positive pole terminal and a negative pole terminal, thus requiring a large mounting area.

Also, the conventional terminal is plated with a Pb-containing solder on its end portion which is to be soldered to the circuit board, but a reduction in Pb, which is an environmental pollutant, is demanded. On the other hand, in case Sn or a Sn-alloy, free from Pb, is employed for such plating, whiskers are generated by the heat at the terminal welding and cause short circuiting.

SUMMARY OF THE INVENTION

In consideration of the foregoing, an object of the present invention is to provide a terminal capable of reducing the mounting area of an electrochemical cell and avoiding whisker generation, and an electrochemical cell utilizing such terminal.

The above-mentioned object can be attained, according to the invention, by soldering either of the electrodes of the electrochemical cell itself directly to a circuit board, whereby a reduction in the mounting area can be achieved. Also, a method for suppressing generation of whiskers from Sn or a Sn-alloy was achieved after consideration of various underlying platings.

Thus, the electrochemical cell of the invention adapted for reflow soldering is an electrochemical cell of coin or button type having a terminal to be soldered to a circuit board, in which either the negative pole can or the positive pole can is connected to the terminal, but not both.

Also it has a configuration including a terminal connected to either the negative pole can or the positive pole can, and at least one of the group consisting of an Au layer, a Sn layer, a Sn-alloy layer and a Ni layer on the bottom surface of the can to which a terminal is not connected. Furthermore, the bottom surface of a can to which a terminal is not connected is provided with a Sn layer or a Sn-alloy layer formed by plating. Furthermore, a Ni layer or a Ni-alloy layer is provided as an underlying layer of the Sn layer or the Sn-alloy layer.

The Sn-alloy layer includes a Bi—Sn alloy layer, an Ag—Sn alloy layer or a Cu—Sn alloy layer. Also, the Ni-alloy layer includes a B—Ni alloy or a P—Ni alloy. Furthermore, the terminal mounted on either the negative pole can or the positive pole can is bent to have a step of a height which is larger than the height of the electrochemical cell to which the terminal is mounted.

BRIEF DESCRIPTION OF THE DRAWINGS

FIG. 3 is a lateral view of an electrochemical cell of the present invention.

DESCRIPTION OF THE PREFERRED EMBODIMENTS

Figure 1:
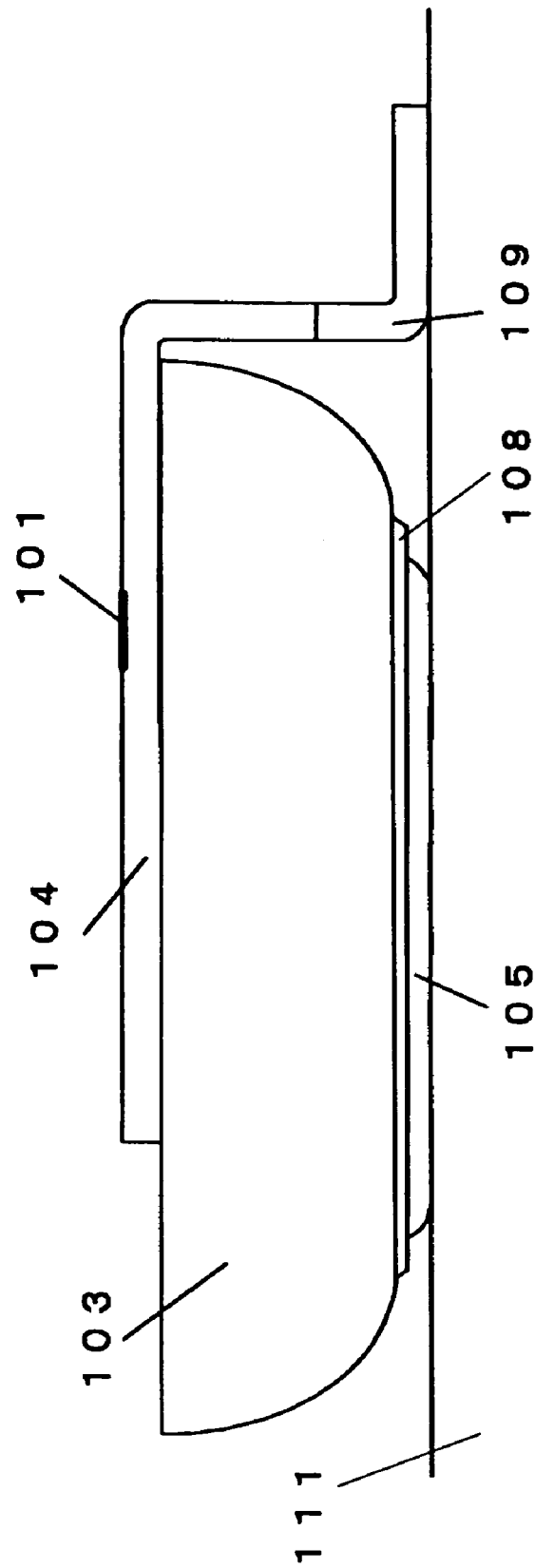
FIG. 1 is a lateral view of an electrochemical cell of the present invention.
Figure 2:
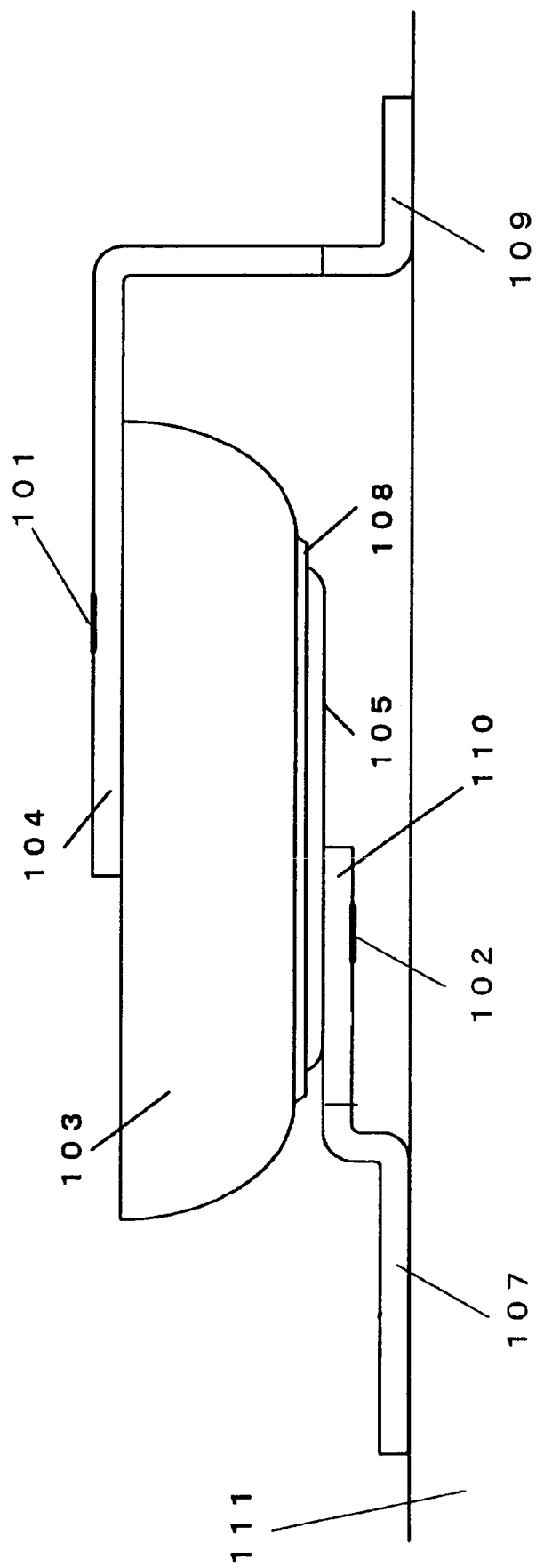
FIG. 2 is a lateral view of a prior electrochemical cell.

An electrochemical cell of the present invention is mounted on a circuit board by soldering one electrode can directly to the circuit board and by connecting a terminal to the other electrode can only. FIG. 1 is a schematic lateral view showing a state where a terminal is connected to a positive pole can. The electrochemical cell of the present embodiment is formed by hermetically sealing a positive pole can 103 and a negative pole can 105 with a gasket 108 in between, and connecting a positive pole terminal 104 to the positive pole can 103. The can and the terminal, are fixedly attached by laser welding at a laser weld point 101.

The positive pole terminal 104 is provided with a plated layer 109. The plated layer is constituted of an underlying layer and a surface layer. The underlying layer is formed by Ni or a Ni alloy. The surface layer is formed from Au, Sn or a Sn alloy. The negative pole can 105 is soldered to a circuit board 111.

In case of employing only one terminal as explained above, the negative pole can or the positive pole can of the electrochemical cell has to be directly soldered to the circuit board. Therefore, in consideration of solder wetting, a layer of Au, Sn, a Sn-alloy, or Ni has to be provided on the can to be directly soldered to the circuit board. Such layer may be formed by a gaseous phase process such as evaporation or sputtering, a liquid phase process such as plating, or a CVD process.

FIG. 3 is a schematic lateral view showing a state where a terminal is connected to a negative pole can. The electrochemical cell of the present embodiment is formed by hermetically sealing a positive pole can 103 and a negative pole can 105 with a gasket 108 in between, and soldering the positive pole can 103 to a circuit board 111. On the negative pole can 105, a negative pole terminal 110 is fixed at a laser weld point 102. The negative pole terminal 110 is provided with a plated layer 107. The plated layer is constituted of an underlying layer and a surface layer. The underlying layer is formed from Ni or a Ni alloy. The surface layer is formed by Sn or a Sn alloy.

In case a Sn metal, a Bi-containing Sn-alloy, an Ag-containing Sn-alloy or a Cu-containing Sn-alloy does not contain Pb, care must be taken, since whiskers are generated by the heat at the laser welding. In case a Sn layer or a Sn-alloy layer is provided on the positive pole can 103 in the structure shown in FIG. 3, a short circuiting with the negative pole terminal 110 may result due to the growth of whiskers. In order to prevent such phenomenon, it is necessary to employ a Ni layer or a Ni-alloy layer as an underlying layer. As an underlying Ni, a plated film of a Ni metal, a B—Ni alloy, or a P—Ni alloy is particularly effective.

In case of employing a single terminal only, the height of the step 106 of the terminal has to be made larger than the height of the electrochemical cell, as shown in FIG. 3. In case the height of the step 106 of the terminal is smaller than the height of the electrochemical cell, the terminal (negative pole terminal 110 in FIG. 3) cannot touch the circuit board, so that the soldering cannot be achieved.

In the electrochemical cell of the invention, since either the negative pole can or the positive pole can is reflow soldered directly to the circuit board, the gasket comprising the electrochemical cell has to be of a higher heat resistance than that in a configuration having two terminals. For the gasket, polyphenylene sulfide (PPS), polyethylene terephthalate, polyamide, a liquid crystal polymer (LCP), a tetrafluoroethylene-perfluoroalkyl vinyl ether copolymer resin (PFA), a polyetherether ketone resin (PEEK), a polyethernitrile resin (PEN), and polyamidimide are satisfactory in heat resistance. In particular, polyphenylene sulfide (PPS) and polyetheretherketone resin (PEEK) are satisfactory in heat resistance. It was also experimentally found that similar effects as in the present embodiment can be obtained with the above material in which glass fibers, mica whiskers, fine ceramic powder etc. are added in an amount not exceeding 10 wt. %.

EXAMPLES

Example 1

On a surface of a stainless steel plate (SUS 304) of a thickness of 0.15 mm, a Cu plating was applied with a thickness of 2 μm, and a solder plating of a Sn-alloy was applied thereon with a thickness of 5 μm. This stainless steel plate was made into the can for the negative pole, with the plated surface positioned at the outside of an electrochemical cell. The negative pole can thus formed was employed in preparing an electric double layer capacitor of 414 size. A gasket was constituted of PPS. On this electric double layer capacitor, a positive pole terminal of a width of 2 mm was laser welded. On the end portion of the positive pole terminal, a Cu plating was applied with a thickness of 2 μm, and a solder plated layer of a Sn-alloy solder was applied thereon with a thickness of 5 μm.

A cream solder was applied on a surface of a circuit board, coming into contact with the electric double layer capacitor of this example. The electric double layer capacitor was placed on the circuit board and was subjected to a reflow soldering. There were employed conditions of heating for 3 minutes at 180° C., then elevating the temperature to 240° C. during the course of 1 minute, maintaining the temperature of 240° C. for 5 seconds, and then lowering the temperature.

The adhesion strength of soldering between the negative pole can and the circuit board was 1.3 times the adhesion strength between the positive pole terminal and the circuit board. This showed that a configuration having only one terminal not only reduces the mounting area but also increases the adhesion strength.

Example 2

On a surface of a stainless steel plate (SUS 316) of a thickness of 0.10 mm, a Ni plating was applied with a thickness of 1 μm, and a Sn solder plating was applied thereon with a thickness of 5 μm. The stainless steel plate was made into the can for the positive pole, with the plated surface positioned at the outside of the electrochemical cell. The positive pole can thus formed was employed in preparing an organic electrolyte secondary battery of 414 size. A gasket was constituted of PEEK. On this organic electrolyte secondary battery, a negative pole terminal of a width of 2 mm was laser welded. On the end portion of the negative pole terminal, a Ni plating was applied with a thickness of 1 μm, and a Sn solder plated layer applied thereon with a thickness of 3 μm.

The height of the step 106 of the terminal was made larger by 0.1 mm than the height of the organic electrolyte secondary battery. Since the organic electrolyte secondary battery was prepared with a tolerance of ±0.05, there can be avoided a situation where the plated layer at the end portion of the negative pole terminal is separated from the circuit board and not soldered thereto due to the height of the organic electrolyte secondary battery.

In an investigation for whisker generation by storing the prepared organic electrolyte secondary battery for 1500 hours at 50° C. and 85% RH, whiskers of 30 μm or larger could not be found. Also in a similar investigation employing a B—Ni alloy or a P—Ni alloy as an underlying plating for Sn, no whisker generation was observed. Also, no whisker generation was observed in case of employing a Bi—Sn alloy, an Ag—Sn alloy, or a Cu—Sn alloy instead of Sn alone, and employing a Ni metal, a B—Ni alloy or a P—Ni alloy as the underlying layer.

A Pb-free cream solder was applied on the surface of a circuit board, coming into contact with the organic electrolyte secondary battery of this example. The organic electrolyte secondary battery was placed on the circuit board and was subjected to a reflow soldering. There were employed conditions of heating for 3 minutes at 200° C., then elevating the temperature to 260° C. over the course of 1 minute, maintaining a temperature of 260° C. for 5 seconds and then lowering the temperature.

The organic electrolyte secondary battery was in contact at a slight incline with the circuit board, but the solder entered the gap so that the adhesion was not deteriorated.

An adhesion strength of soldering between the positive pole can and the circuit board was 1.5 times of an adhesion strength between the negative pole terminal and the circuit board. It is identified that a configuration having only one terminal not only reduces the mounting area but also increases the adhesion strength.

The present invention relates to an electrochemical cell with terminals, and the electrochemical cell itself may be a primary battery, a secondary battery, an electric double layer capacitor etc. It is applicable to any configuration including an electronic circuit board on which an electrochemical cell is mounted, and is not limited in its application.

The foregoing examples have described a film forming method by plating, but a similar effect can be expected with films of same compositions. Therefore, there can be employed other film forming methods such as evaporation, sputtering or CVD.

As explained in the examples, in an electrochemical cell of coin or button type with terminals, the mounting area can be significantly reduced by connecting only one terminal and by soldering the negative pole can or the positive pole can of the electrochemical cell directly to a circuit board. Also, by this method soldering strength is increased, significantly improving the reliability of mounting.

What is claimed is:

1. An electrochemical cell capable of reflow soldering comprising a terminal fixed to either the negative pole can or the positive pole can, and at least one of the group consisting of Au layer, Sn layer, Sn-alloy layer and Ni layer which is provided on the bottom surface of the can to which said terminal is not connected.

2. An electrochemical cell according to claim 1, comprising a Sn layer or a Sn-alloy layer formed by plating on the bottom surface of a can to which said terminal is not connected.

3. An electrochemical cell according to claim 2, wherein said terminal mounted on either one of the negative pole can and the positive pole can is bent to have a step of height which is larger than the mounted height of the elecrochemical cell.

4. An electrochemical cell according to claim 1, further comprising a Ni layer or a Ni-alloy layer as a layer underlying said Au layer, said Sn layer or said Sn-alloy layer.

5. An electrochemcial cell according to claim 4, wherein said Ni-alloy layer includes either B—Ni alloy, or P—Ni alloy.

6. An electrochemical cell according to claim 5, wherein said terminal mounted on either one of the negative pole can and the positive pole can is bent to have a step of height which is larger than the mounted height of the electrochemical cell.

7. An electrochemical cell according to claim 4, wherein said terminal mounted on either one of the negative pole can and the positive pole can is bent to have a step of height which is larger than the mounted height of the electrochemical cell.

8. An electrochemical cell according to claim 1, wherein said Sn-alloy layer includes any one of the group consisting of Bi—Sn alloy, Ag—Sn alloy, and Cu—Su alloy.

9. An electrochemcial cell according to claim 8, wherein said terminal mounted on either one of the negative pole can and the positive pole can is bent to have a step of height which is larger than the mounted height of the electrochemical cell.

10. An electrochemical cell according to claim 1, wherein said terminal mounted on either one of the negative pole can and the positive pole can is bent to have a step of height which is larger than the mounted height of the electrochemical cell.

* * * * *